United States Patent [19]

Kaufmann

[11] 4,373,572

[45] Feb. 15, 1983

[54] COMMERCIAL LAUNDRY HEAT RECOVERY SYSTEM

[75] Inventor: Richard O. Kaufmann, Tucson, Ariz.

[73] Assignee: Thermal Engineering of Arizona, Inc., Tucson, Ariz.

[21] Appl. No.: 240,844

[22] Filed: Mar. 5, 1981

[51] Int. Cl.³ .............................................. F24H 1/00
[52] U.S. Cl. ...................................... 165/1; 165/139; 165/DIG. 12
[58] Field of Search ................. 165/DIG. 12, 139, 95, 165/1

[56] References Cited

U.S. PATENT DOCUMENTS

| | | | |
|---|---|---|---|
| 337,716 | 3/1886 | Todd | 165/139 X |
| 2,817,498 | 12/1957 | Miller | 165/139 X |
| 2,843,367 | 7/1958 | Bogus et al. | 165/139 X |
| 3,480,077 | 11/1969 | Stevens | 165/139 X |
| 3,986,345 | 10/1976 | Pilz et al. | 165/DIG. 12 |
| 4,150,787 | 4/1979 | Braathen | 165/DIG. 12 |
| 4,176,788 | 12/1979 | Holman | 165/DIG. 12 |
| 4,304,292 | 12/1981 | Cardone et al. | 165/DIG. 12 |

FOREIGN PATENT DOCUMENTS 78641  4/1919  Austria ................................ 165/139

*Primary Examiner*—William E. Tapolcai
*Attorney, Agent, or Firm*—Cahill, Sutton & Thomas

[57] ABSTRACT

Waste water of above ambient temperature in a commercial laundry is directed through a self-cleaning plate and frame heat exchanger to heat incoming fresh water. Some of the fresh water heated to a first temperature is directed to a cold water storage tank to raise the water therein above ambient temperature which results in substantially lessened downstream requirements for heat input with commensurate cost reductions. The remainder of the fresh water is heated to a higher second temperature and is directed to a hot water storage tank. A system of valves regulates the temperature of the water flowing into each of the hot and cold water storage tanks to maintain a preset temperature in each of the storage tanks.

8 Claims, 1 Drawing Figure

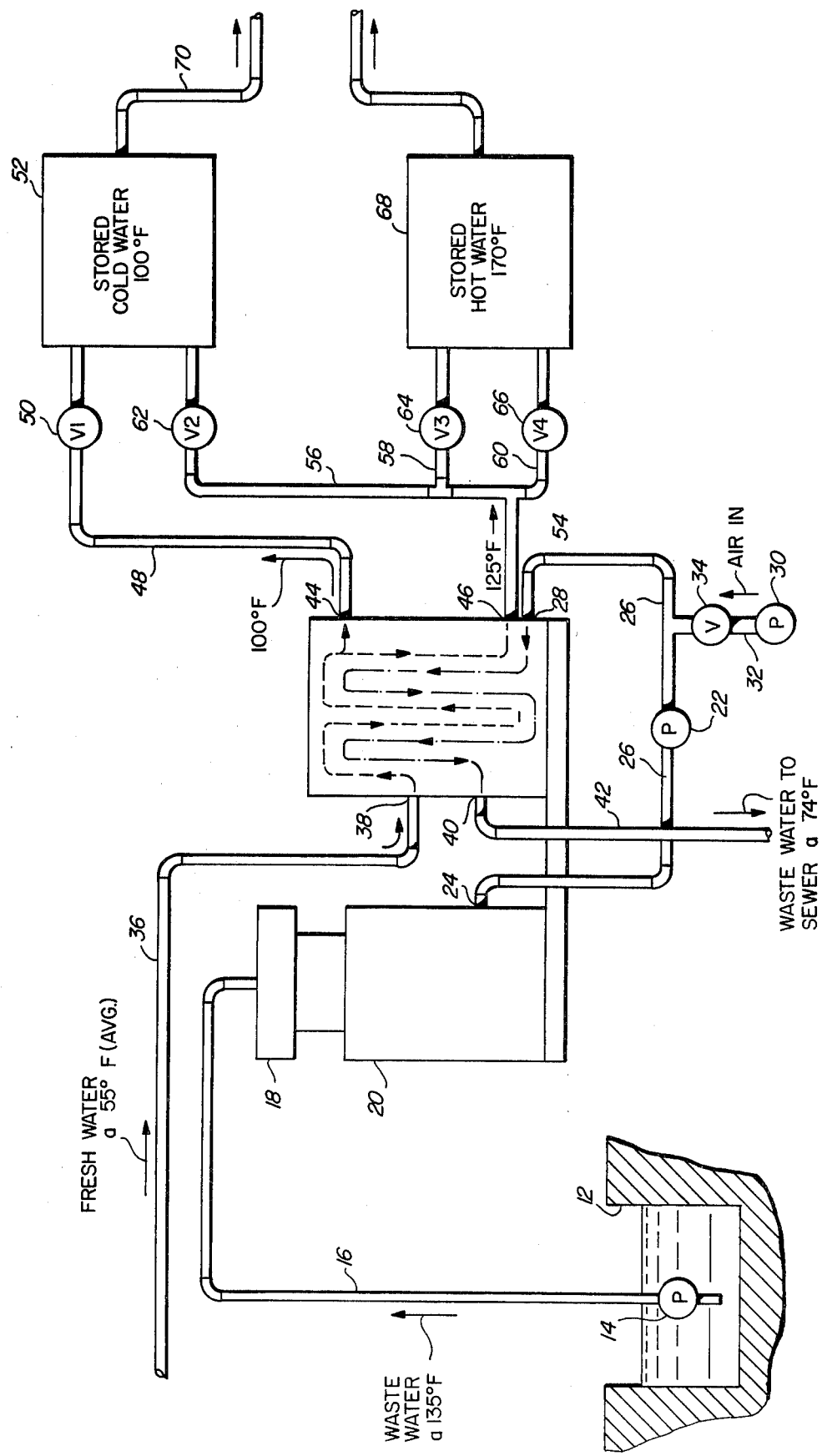

COMMERCIAL LAUNDRY HEAT RECOVERY SYSTEM

The present invention is related to an invention described in an application for United States Patent entitled "ON LINE SCRUBBING SYSTEM FOR PLATE AND FRAME HEAT EXCHANGERS", Ser. No. 101,719, filed Dec. 10, 1979, and describing an invention made by the present inventor and assigned to the present assignee.

The present invention is directed to heat recovery systems and, more particularly, to heat recovery systems particularly adapted to commercial laundry requirements.

In commercial laundries, a very substantial part of the operating hot water must be heated and air must be heated to dry the washed laundry. Most laundries reduce the heating costs to some extent by employing a heat exchanger to transfer heat from waste water to preheat the water flowing into a hot water storage tank. Usually, the heat exchangers employed are of the tube and shell type since only this type of the readily commercially available heat exchangers can accommodate the particulate matter suspended in the waste water without clogging. Unfortunately, the tube and shell heat exchangers are less efficient than other heat exchangers, such as the plate and frame type.

In applicant's above-referenced copending patent application, there is described a scrubbing system for use in conjunction with a plate and frame heat exchanger which system renders the plate and frame heat exchanger self-cleaning. This self-cleaning capability makes it practical to use a plate and frame heat exchanger in a commercial laundry.

The difference in temperature between that of the inflowing fresh water and the waste water in a commercial laundry is relatively small. The resulting narrow range imposes severe constraints upon the amount of heat which can actually be recovered unless a relatively efficient heat exchanger is used. Moreover, the cost of operating a relatively efficient heat exchanger in the adverse and hostile environment of having contaminated waste water as one of the fluids may impose such large additional operating costs so as to provide an insufficient margin between the total savings effected and the cost of operating a heat recovery system and force the use of low efficiency heat exchangers.

The present invention employs a plate and frame heat exchanger modified to include a self-cleaning capability to prevent the solid and liquid contaminants in the waste water flowing therethrough from clogging the passageways in the heat exchanger. The fresh water input to the heat exchanger is brought out through one of two outlets. To provide the maximum benefit from the heat content available, the first outlet provides heated fresh water at a first temperature through a valve to the cold water storage tank and raises its temperature above ambient. A second outlet provides heated fresh water at a higher second temperature to either the cold water storage tank or to the hot water storage tank through one or more of a number of separately actuatable valves.

It is therefore a primary object of the present invention to provide a heat recovery system for commercial laundries which effectively reduces the overall heat input requirements by recovering heat from waste water.

Another object of the present invention is to provide a heat sink for recovery of low grade heat in waste water.

Still another object of the present invention is to provide a selective distribution of heat recovered from waste water.

Yet another object of the present invention is to provide a thermally efficient heat exchanger useable with contaminated waste water to inject heat into both the hot and cold water storage tanks in a commercial laundry.

A further object of the present invention is to reduce the heating costs in a commercial laundry by practical extraction of heat from waste water.

A yet further object of the present invention is to reduce the hot water useage in a commercial laundry.

A still further object of the present invention is to reduce the drying costs in a commercial laundry.

These and other objects of the present invention will become apparent to those skilled in the art as the description thereof proceeds.

The present invention may be described with greater specificity and clarity with reference to the sole figure depicting in a simplified flow diagram a heat recovery system for commercial laundries.

A heat exchanger in a commercial laundry is the device, which transfers the heat from the waste water to the inflowing fresh water. The efficiency of the heat exchanger is a function of the cleanliness of the heat transfer surfaces. Decades ago, the heat exchangers used were pit reclaimers. These heat exchangers were no more than a series of tubes dropped into the waste water pit. The cold fresh water circulated through the tubes and became warmed by the surrounding waste water. These pit reclaimers performed very poorly because it was impossible to keep the outside, the heat transfer surfaces, of the tubes clean. A shell and tube heat exchanger was introduced in the 1940's and represented a major improvement over the pit reclaimer. Herein, hot waste water flowed through the tube section while cold fresh water flowed through the radially concentric shell section. To keep the heat transfer surfaces clean, the interior of the tube section had to be carefully designed to present minimal flow constrictions upon which the suspended particulate matter might collect. To aid in preventing buildup of particulate matter, the flow within the tubes was cyclically reversed. Although the tube and shell heat exchanger was approximately four times as efficient as the pit reclaimers, it presented difficulties. The cyclical reversed flow within the tubes caused concurrent flow (flow in the same direction) of both the waste and fresh water. Such concurrent flow resulted in substantially lower heat transfer as the maximum temperature achievable was that of the temperature of the waste water at the discharge outlet. With reversed flow, the maximum achievable temperature is that of the waste water at the inlet. Moreover, flow reversal did not prevent fouling of the tubes by liquid contaminants and very fine particulate matter. Such fouling reduced the heat transfer rate and required periodic cleaning.

A major improvement over the tube and shell heat exchanger has been the development of plate and frame exchangers. A plate and frame heat exchanger consists of a series of gasketed electropolished stainless steel plates bolted together between end frames. The gaskets and portholes in the plates allow the fluids to flow in alternate channels. The fluids at all times flow countercurrently through the channels and are evenly distributed in each channel. This structure, particularly the separating thin walls in combination with reversed flow and the highly turbulent flow produces cleaner heat transfer surfaces and cumulatively better heat transfer rates.

A conventional plate and frame heat exchanger has relatively small interstices between opposing plates. As the waste water in commercial laundries includes a substantial amount of fine particulate matter and liquid contaminants, clogging of a conventional plate and frame heat exchanger occurs rapidly when used. As described in detail in the above referenced copending patent application entitled "ON LINE SCRUBBING SYSTEM FOR PLATE AND FRAME HEAT EXCHANGERS", Ser. No. 101,719, a conventional plate and frame heat exchanger can be made self-cleaning and thereby suitable for use in commercial laundries. Thus, it is now possible for a commercial laundry to use the most efficient type of commercially available heat exchanger to extract heat from waste water.

Referring to the sole figure, the description of the structure and operation of the present invention will be undertaken. Heat exchanger 10 is a plate and frame heat exchanger for transferring heat from waste water to fresh water. The waste water in a commercial laundry is usually dumped into a sump pit 12 and may be at a temperature as high as 135° F. A pump 14 pumps the waste water through conduit 16 and filter 18 into feed tank 20. The filter or screen may have a mesh size in the range of 0.003" to 0.009" and removes most of the particulate matter. Means not shown periodically clean the screen and dispose of the filtered material.

A pump 22 pumps the waste water from the feed tank through outlet 24, conduit 26 and into inlet 28 of heat exchanger 10. As described in more detail in copending patent application Ser. No. 101,719, a pump 30 pumps air under pressure through conduit 32, and valve 34 into conduit 26. The pumped air flow or air stream becomes entrained bubbles within the fluid flowing through conduit 26 and enters the heat exchanger. The entrained air permeated throughout the waste water flowing intermediate the plates of the heat exchanger results in a continual variation of the density of the flow across any given point on the plate surfaces. Such density variations produce successive impacts upon the surfaces of the plates. These successive impacts tend to preclude deposition of particulate matter upon the plate surfaces and tend to dislodge any film, scale, or deposit buildup upon the plate surfaces by the water transported chemicals or due to chemical interaction between the plate surfaces and the chemicals contained in or conveyed by the waste water. Accordingly, the entrained air bubbles provide a scrubbing action to substantially reduce the rate of buildup of deposits upon the plate surfaces. Such reduction in buildup permits a more effective heat transfer for a longer period of time and the heat transfer unit has self-cleaning qualities.

The waste water exits from heat exchanger 10 through outlet 40 and is conveyed to a sewer or similar disposal point through conduit 42. Nominally, the water temperature of the waste water has been reduced to 74° F.

The fresh water to be heated flows through conduit 36, usually from the municipal water supply. Nominally, the temperature of the fresh water is 55° F. The fresh water enters heat exchanger 10 through inlet 38.

The fresh water which has been heated exits through one of outlets 44, 46. Outlet 44 is in fluid communication with a point interior of heat exchanger 10 short of the full flow path possible for the fresh water. Outlet 46, on the other hand, is in fluid communication with the end of the full flow path available for the fresh water within the heat exchanger. Because of the resulting flow path length difference of the fresh water within the heat transfer unit, the fresh water flowing through outlet 44 will be at a lower temperature than that flowing through outlet 46. Nominally, the respective temperatures may be 100° F. and 125° F. Moreover, for reasons which will become apparent below, the flow rate through outlet 44 is approximately one half of that through outlet 46.

The fresh water flowing through outlet 44 flows through conduit 48 via valve 50 to cold water storage tank 52. The water flow through outlet 46 flows through conduit 54 into branches 56, 58 and 60. Flow through each of these branches is controlled by valves 62, 64 and 66, respectively. From valve 62, the heated fresh water flows into cold water storage tank 52. Both branches 58 and 60 feed hot water into hot water storage tank 68. Outflow from cold water storage tank 52 and hot water storage tank 68 occurs through conduits 70 and 72, respectively.

With the above heat recovery system, and assuming relatively constant and regular withdrawal of water from the cold water storage tank, the water therein is nominally at 100° F. To accommodate more rapid water withdrawal and/or to increase the temperature of the cold water storage tank in the event it has cooled over a period of time, valves 62 is opened to provide a flow thereinto of higher temperature water. These valves may be controlled manually or through temperature and/or flow rate sensors suitably mounted in the tanks or attendant conduits. Valves 64 and 66 regulate the flow of preheated water into hot water storage tank 68. Preferably, these valves are preset to a given flow rate such that actuation of one or the other or both valves will provide a known flow rate to the hot water storage tank to replenish rapidly or commensurate with the withdrawal flow rate from the hot water storage tank.

An example reviewing the water flow rates, temperatures and dollar savings effected by the present invention will be presented to emphasize the commercial importance of the above described heat recovery system. The commercial laundry from which the following figures were developed was an existing operating laundry having a total water flow rate of one hundred gallons per minute (100 gpm) and using sixty-five percent (65%) hot water. By installing the self-cleaning plate and frame heat exchanger as described in the above referenced copending patent application, Ser. No. 101,719, and without any heating of the water in the cold water storage tank, preheating of the fresh water to within 8° F. of the temperature of the waste water was possible. The heating costs associated therewith were $8.65 per hour as opposed to $17.46 per hour when the heat exchanger was not employed to preheat the hot water. The temperature of the waste water discharged into the sewer was reduced from 120° F. to 83° F. which temperature difference represents the heat recovered.

The remaining temperature difference between the inflowing fresh water at 55° F. and the discharged waste water at 83° F. represents approximately a $12,900.00 loss in heating costs per year for this size plant. By employing the heat recovery system described above to heat the cold fresh water, the temperature of the cold water storage tank was raised to a mean temperature of approximately 100° F. The consequent and ripple effects from such heating were astonishing. The immediate consequent effects included: the waste water temperature in waste water pit 12 rose to 135° F; the higher temperature of the waste water pit permitted preheating the water in the hot water storage tank to 125° F.; moreover, the heat exchanger operated more efficiently resulting in the temperature of the waste water discharged into the sewer dropping to 74° F; and, most importantly, the water heating costs dropped to $6.83 per hour from $8.65 per hour.

Certain ripple effects of importance included the following. With a cold water temperature of 100° F., the water demand from the hot water storage tank dropped from two thirds (65 gpm) to approximately one half (49 gpm). The reduction of hot water consumption tended to cause a slight drop of the waste water pit temperature, a slight drop of the preheated hot water temperature and the temperature of the waste water discharged into the sewer was lowered to 75° F. These ripple effect hot water heating cost savings reduced the hourly heating costs to $6.41 per hour. Furthermore, the temperature of the fabrics extracted from the laundry was increased to approxiamtely 100° F. as opposed to a former temperature of 57° F. This substantial temperature increase reduced the retained water in the fabric by about eight percent (8%). For a plant of the size stated above, this eight percent (8%) represented approximately 25,900 gallons less of water which had been evaporated per year to dry the fabrics. The savings in the reduction of heat necessary as the water content of the fabrics was less resulted in a savings of approximately $2,120.00 per year. A secondary benefit resulted from the fact that the fabrics were at a higher temperature and thereby required less heat for evaporation which resulted in a further fuel savings of about $750.00 per year.

Accordingly, the preheating of the cold water by the system described above can result in substantial savings over even the highly efficient heat recovery systems earlier developed by the applicant.

While the principles of the invention have now been made clear in an illustrative embodiment, there will be immediately obvious to those skilled in the art many modifications of structure, arrangement, porportions, elements, materials, and components, used in the practice of the invention which are particularly adapted for specific environments and operating requirements without departing from those principles.

I claim:

1. Heat recovery apparatus for commercial laundries, said apparatus comprising in combination:
   (a) a source of heated waste water;
   (b) a source of fresh water;
   (c) a plate and frame heat exchanger for transferring heat from the waste water to the fresh water, said plate and frame heat exchanger including means for entraining air bubbles with the waste water flowing into and through said plate and frame heat exchanger to scrub the surfaces coming in contact therewith;
   (d) a cold water storage tank for receiving a proportion of the fresh water heated by said plate and frame heat exchanger to raise the temperature of the water therein above ambient temperature; and
   (e) a hot water storage tank for receiving a proportion of the fresh water heated by said plate and frame heat exchanger to preheat the water therein.

2. The apparatus as set forth in claim 1 including a first means for conveying the heated fresh water to the cold water storage tank and a second means for conveying the heated fresh water to the hot water storage tank.

3. The apparatus as set forth in claim 2 wherein said first conveying means includes an outlet in fluid communication with the fresh water flowing through said plate and frame heat exchanger at a point short of the full length of the fresh water flow path through said plate and frame heat exchanger to provide fresh water outflow at a first temperature and wherein said second conveying means includes an outlet in fluid communication with the fresh water flowing through said plate and frame heat exchanger at the terminal end of the fresh water flow path through said plate and frame heat exchanger to provide fresh water outflow at a second temperature.

4. The apparatus as set forth in claim 3 wherein the flow paths of the waste water and fresh water are nonconcurrent.

5. The apparatus as set forth in claim 4 including means for regulating the flow through said first and second conveying means.

6. A method for recovering heat from heated waste water in a commercial laundry, said method comprising the steps of:
   (a) pumping the heated waste water through a plate and frame heat exchanger;
   (b) entraining air bubbles in the pumped waste water to scour the surfaces of the plate and frame heat exchanger coming in contact therewith;
   (c) introducing fresh water into the plate and frame heat exchanger to receive heat from the waste water through a heat transfer effected by the plate and frame heat exchanger;
   (d) withdrawing a first proportion of the heated fresh water;
   (e) conveying the first proportion of the heated fresh water to a cold water storage tank;
   (f) withdrawing a second proportion of the heated fresh water; and
   (g) conveying the second proportion of the heated fresh water to a hot water storage tank.

7. The method as set forth in claim 6 including the step of regulating the conveyance of the heated fresh water to the hot and cold storage tanks.

8. The method as set forth in claim 7 wherein said step of withdrawing the first proportion is performed at a location short of the full flow path of the fresh water through the plate and frame heat exchanger.

* * * * *